(12) United States Patent
Nakayama

(10) Patent No.: US 10,475,176 B2
(45) Date of Patent: Nov. 12, 2019

(54) INSPECTION SYSTEM FOR WIRE ELECTRICAL DISCHARGE MACHINE

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 91 days.

(21) Appl. No.: 15/444,007

(22) Filed: Feb. 27, 2017

(65) Prior Publication Data

US 2017/0256050 A1    Sep. 7, 2017

(30) Foreign Application Priority Data

Mar. 4, 2016 (JP) ................................ 2016-041937

(51) Int. Cl.
*G06K 9/20* (2006.01)
*G06K 9/62* (2006.01)
(Continued)

(52) U.S. Cl.
CPC .......... *G06T 7/0008* (2013.01); *G05B 19/188* (2013.01); *G06K 9/20* (2013.01);
(Continued)

(58) Field of Classification Search
CPC ........ H02H 1/04; H02H 3/006; A61B 5/0472; A61B 5/7221
(Continued)

(56) References Cited

U.S. PATENT DOCUMENTS 6,032,522 A * 3/2000 Clark ...................... G01L 17/00
                                                    177/210 R
6,224,459 B1 * 5/2001 Stocker .................. B23Q 3/186
                                                    257/E21.23
(Continued)

FOREIGN PATENT DOCUMENTS

CN        1418140 A      5/2003
CN     204308972 U       5/2015
(Continued)

OTHER PUBLICATIONS

Notice of Allowance in JP Application No. 2016-041937 dated Mar. 13, 2018, 6pp.
(Continued)

*Primary Examiner* — Yosef Kassa
(74) *Attorney, Agent, or Firm* — Hauptman Ham, LLP

(57) ABSTRACT

Provided is an inspection system for a wire electrical discharge machine, capable of automatically performing inspection of a constituent element and the like. The inspection system for a wire electrical discharge machine is provided with the wire electrical discharge machine, a robot for inspecting the constituent element of the wire electrical discharge machine, an image pickup device provided on a movable part of the robot and configured to image the constituent element, an image processing unit configured to acquire an image of the constituent element by means of the image pickup device, and a maintenance necessity determination unit configured to determine the necessity of maintenance of the constituent element based on the image acquired by the image processing unit.

12 Claims, 7 Drawing Sheets

(51) Int. Cl.
*G06T 7/00* (2017.01)
*G05B 19/18* (2006.01)
*G05B 19/4065* (2006.01)

(52) U.S. Cl.
CPC .. *G06K 9/6202* (2013.01); *G05B 2219/45043* (2013.01); *G06T 2207/30164* (2013.01)

(58) Field of Classification Search
USPC ............... 382/141, 143, 145, 149, 209, 252; 348/86, 125, 126
See application file for complete search history.

(56) References Cited

U.S. PATENT DOCUMENTS

| | | | | |
|---|---|---|---|---|
| 6,614,923 | B1 * | 9/2003 | Shishido | G06T 5/006 382/144 |
| 6,937,754 | B1 * | 8/2005 | Eguchi | G01N 21/956 348/125 |
| 7,013,195 | B2 | 3/2006 | Maki | B23H 7/065 219/69.1 |
| 7,124,041 | B1 * | 10/2006 | Johnson | G05B 9/02 702/58 |
| 7,194,833 | B1 * | 3/2007 | Curry | F41A 19/12 42/14 |
| 7,214,947 | B2 * | 5/2007 | Bueno | G01T 1/2018 250/370.11 |
| 7,218,771 | B2 * | 5/2007 | Gilat-Bernshtein | G01N 21/95607 356/237.4 |
| 7,227,926 | B2 * | 6/2007 | Kameshima | A61B 6/405 378/98.8 |
| 7,294,833 | B2 * | 11/2007 | Konno | H01J 37/265 250/310 |
| 7,358,502 | B1 * | 4/2008 | Appleby | G03B 42/04 250/370.14 |
| 7,446,496 | B2 * | 11/2008 | Ogawa | B25J 9/1674 318/568.24 |
| 7,464,560 | B2 * | 12/2008 | Nishino | B60H 1/00328 219/208 |
| 7,995,822 | B2 * | 8/2011 | Lang | A61B 6/469 382/128 |
| 7,995,833 | B2 * | 8/2011 | Konno | H01J 37/265 382/149 |
| 8,073,317 | B2 * | 12/2011 | Kitano | G02B 27/646 348/208.11 |
| 8,633,713 | B2 * | 1/2014 | Langley | G01N 27/24 324/600 |
| 8,812,154 | B2 * | 8/2014 | Vian | G07C 5/008 700/245 |
| 8,824,018 | B2 * | 9/2014 | Murakami | H04N 1/00811 358/1.11 |
| 2002/0003415 | A1 | 1/2002 | Nakai et al. | |
| 2003/0010753 | A1 | 1/2003 | Yamada et al. | |
| 2016/0158863 | A1 | 6/2016 | Hiraga | |
| 2016/0263687 | A1 | 9/2016 | Matsunaga et al. | |
| 2016/0267806 | A1 * | 9/2016 | Hsu | G09B 19/24 |
| 2016/0368150 | A1 * | 12/2016 | Maruyama | B25J 9/1697 |
| 2017/0056991 | A1 | 3/2017 | Yamaguchi | |

FOREIGN PATENT DOCUMENTS

| | | |
|---|---|---|
| JP | 63-113708 A | 5/1988 |
| JP | 10-249648 A | 9/1998 |
| JP | 2002-18680 A | 1/2002 |
| JP | 2005-191444 A | 7/2005 |
| JP | 2007-210125 A | 8/2007 |
| JP | 2008-102865 A | 5/2008 |
| JP | 2009-61565 A | 3/2009 |
| JP | 2016107381 A | 6/2016 |
| JP | 2017042828 A | 3/2017 |

OTHER PUBLICATIONS

Office Action in DE Application No. 102017103982.1, dated Jun. 3, 2019, 12pp.

* cited by examiner

WIRE SLACK PORTION

PREDETERMINED AREA

PREDETERMINED AREA

WIRE SLACK PORTION

INSPECTION SYSTEM FOR WIRE ELECTRICAL DISCHARGE MACHINE

RELATED APPLICATIONS

The present application claims priority to Japanese Application No. 2016-041937 filed Mar. 4, 2016, the disclosure of which is hereby incorporated by reference herein in its entirety.

BACKGROUND OF THE INVENTION

Field of the Invention

The present invention relates to an inspection system for a wire electrical discharge machine, and more particularly, to a technique for automatically performing inspection of constituent elements of the wire electrical discharge machine.

Description of the Related Art

A wire electrical discharge machine is subject to high probability of occurrence of machining trouble due to such factors as the use of a thinner wire and a larger number of expendable constituent elements, as compared with a cutting machine such as a machining center. Accordingly, there has conventionally been proposed a system in which a robot is used to automatically replace and stretch a wire of the wire electrical discharge machine.

For example, Japanese Patent Application Laid-Open No. 2016-107381 proposes a system that comprises a wire electrical discharge machine and a robot. The wire electrical discharge machine comprises a wire remaining lifetime monitoring means and a wire replacement time determining means. The wire remaining lifetime monitoring means monitors the remaining lifetime of a wire electrode. The wire replacement time determining means determines that it is time to replace the wire electrode if the remaining lifetime is shorter than the electrical discharge machining time. The robot performs wire replacement work when the wire electrode is determined to have reached its replacement time. Moreover, Japanese Patent Application No. 2015-164519 proposes a system in which an articulated robot with a wire stretching mechanism on its hand serves to stretch a wire of a wire electrical discharge machine.

However, Japanese Patent Application Laid-Open No. 2016-107381 and Japanese Patent Application No. 2015-164519 both relate to the wire monitoring and stretching mechanisms and are not designed to automate inspection, cleaning, and replacement operations for various other constituent elements than the wire, typically including expendables. Thus, it is difficult to operate the wire electrical discharge machine unattended, that is, without human intervention.

SUMMARY OF THE INVENTION

The present invention has been made in order to solve the problem described above, and its object is to provide an inspection system for a wire electrical discharge machine, capable of automatically performing inspection of constituent elements of the wire electrical discharge machine.

An inspection system for a wire electrical discharge machine according to one embodiment of the present invention comprises the wire electrical discharge machine, a robot for inspecting a constituent element of the wire electrical discharge machine, and an image pickup device provided on a movable part of the robot and configured to image the constituent element, and is characterized by comprising an image processing unit configured to acquire an image of the constituent element by means of the image pickup device and a maintenance necessity determination unit configured to determine the necessity of maintenance of the constituent element based on the image acquired by the image processing unit.

According to the present embodiment, the inspection system for a wire electrical discharge machine can determine the maintenance necessity based on the image of the constituent element, so that stopping of machining due to trouble in the constituent element to be inspected can be avoided in advance.

An inspection system for a wire electrical discharge machine according to another embodiment of the present invention further comprises a storage unit configured to store a reference image of the constituent element, and the maintenance necessity determination unit determines the maintenance necessity of the constituent element by comparing the reference image and the image acquired by the image processing unit.

An inspection system for a wire electrical discharge machine according to another embodiment of the present invention is characterized in that the reference image is an image of the constituent element in a brand-new state.

According to the present embodiment, the degree of contamination or wear can be determined by comparing the image of the constituent element in the brand-new state and an image obtained after the lapse of a predetermined time, so that stopping of machining due to the attainment of the serviceability limit of the constituent element can be avoided in advance.

An inspection system for a wire electrical discharge machine according to another embodiment of the present invention is characterized in that the reference image is an image of the constituent element just before the attainment of the serviceability limit thereof.

According to the present embodiment, the degree of contamination or wear can be determined by comparing an image of the constituent element close to its serviceability limit and an image obtained after the lapse of a predetermined time, so that stopping of machining due to the attainment of the serviceability limit of the constituent element can be avoided in advance.

An inspection system for a wire electrical discharge machine according to another embodiment of the present invention is characterized in that the maintenance necessity determination unit determines the maintenance necessity by comparing the respective color densities of the reference image and the image acquired by the image processing unit and determining the degree of contamination of the constituent element.

An inspection system for a wire electrical discharge machine according to another embodiment of the present invention is characterized in that the maintenance necessity determination unit determines the maintenance necessity by comparing the respective shapes of the reference image and the image acquired by the image processing unit and determining the degree of wear of the constituent element.

An inspection system for a wire electrical discharge machine according to another embodiment of the present invention is characterized in that the maintenance necessity determination unit determines the maintenance necessity by determining the presence of wire tangling according to whether or not a bent portion of a wire is included in a predetermined area of the side surface of a cylindrical portion of a wire bobbin, based on the image acquired by the image processing unit.

An inspection system for a wire electrical discharge machine according to another embodiment of the present invention is characterized in that the maintenance necessity determination unit determines the maintenance necessity by determining the presence of wire slack according to whether or not a wire exists outside a predetermined area of the side surface of a cylindrical portion of a wire bobbin, based on the image acquired by the image processing unit.

An inspection system for a wire electrical discharge machine according to another embodiment of the present invention is characterized by further comprising a means for accepting an input of setting of a determination reference for the determination of the maintenance necessity.

According to the present embodiment, a user can operate a state close to the determination reference for the determination of the maintenance necessity of the constituent element, that is, the serviceability limit, so that a serviceability limit criterion can be provided with an allowance for a real serviceability limit, whereby the risk of stopping of machining can be further reduced.

An inspection system for a wire electrical discharge machine according to another embodiment of the present invention is characterized by further comprising a means for outputting the result of the determination by the maintenance necessity determination unit to the outside.

An inspection system for a wire electrical discharge machine according to another embodiment of the present invention is characterized in that the robot cleans or replaces the constituent element of the wire electrical discharge machine if the maintenance necessity determination unit determines that the constituent element requires maintenance.

According to the present embodiment, the inspection robot itself is caused to clean or replace the constituent element of the wire electrical discharge machine when the degree of contamination or wear of the constituent element approaches the serviceability limit and requires the cleaning or replacement, so that a more advanced unattended operation of the wire electrical discharge machine can be performed, An inspection system for a wire electrical discharge machine according to another embodiment of the present invention is characterized in that the image processing unit acquires again an image of the constituent element by means of the image pickup device if the constituent element of the wire electrical discharge machine is cleaned or replaced by the robot, the maintenance necessity determination unit determines the maintenance necessity of the constituent element based on the image acquired by the image processing unit, and the wire electrical discharge machine resumes machining if it is ascertained that maintenance of the constituent element is unnecessary. Thus, a further advanced unattended operation of the wire electrical discharge machine can be performed.

According to the present invention, there can be provided an inspection system for a wire electrical discharge machine, capable of automatically performing inspection of constituent elements of the wire electrical discharge machine.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
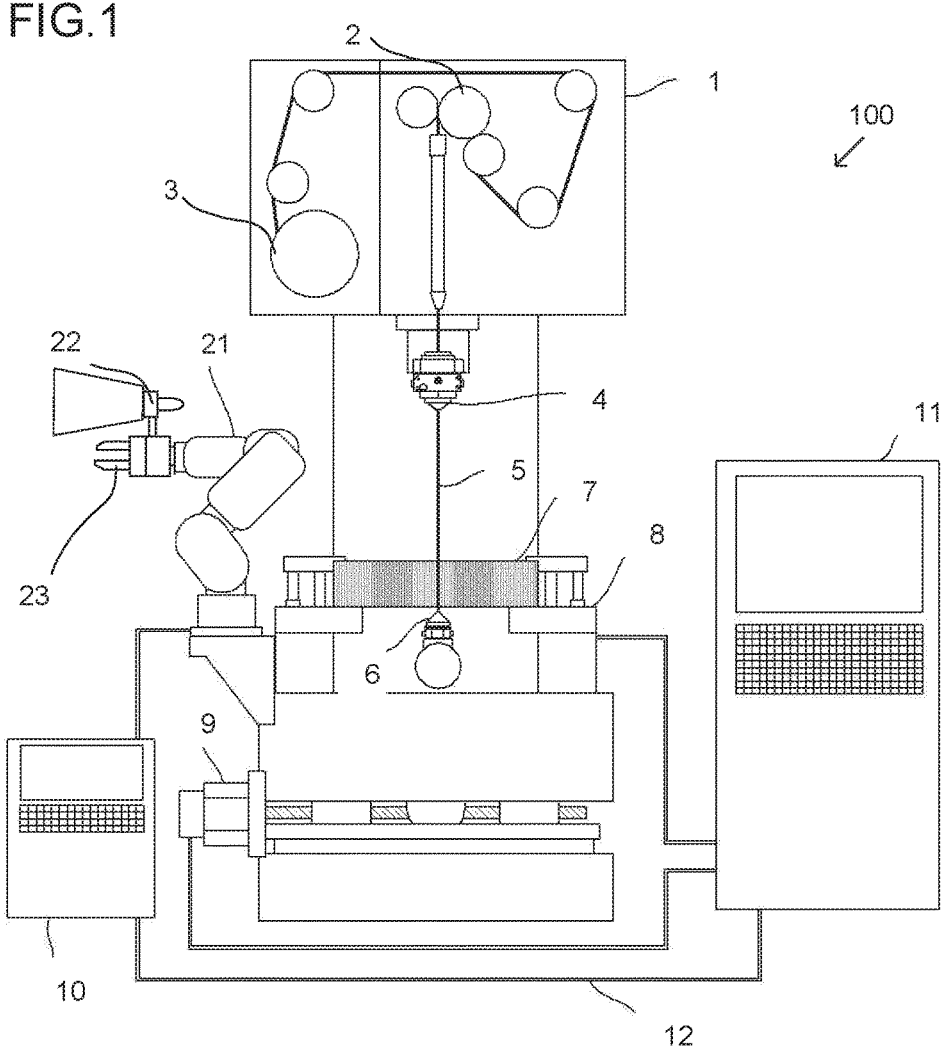
FIG. 1 is a view showing the construction of- an inspection system 100 for a wire electrical discharge machine according to one embodiment of the invention.

A specific embodiment to which the present invention is applied will now be described in detail with reference to the accompanying drawings. Referring first to FIG. 1, there will be described the construction of an inspection system 100 for a wire electrical discharge machine (hereinafter simply referred to as the inspection system 100) according to the embodiment of the invention.

The inspection system 100 comprises the wire electrical discharge machine a robot 21, a wire electrical discharge machine controller 11, and a robot controller 10. The robot controller 10 and the wire electrical discharge machine controller 11 are connected to each other for communication by a transmission means 12.

A typical wire electrical discharge machine comprises a wire drive unit 1, roller 2, bobbin 3, upper guide unit 4, wire 5, lower guide unit 6, workpiece table 8, and servomotor 9. A workpiece 7 is placed on the workpiece table 8. The workpiece 7 is machined into a predetermined shape by a discharge phenomenon that occurs between the wire 5 and the. workpiece 7.

Typically, the robot 21 is mounted on the wire electrical discharge machine. The wrist of the robot 21 is fitted with an image pickup device 22 and a hand 23 that is used for parts replacement.

The robot controller 10 or the wire electrical discharge machine controller 11 comprises an image processing unit, maintenance necessity determination unit, and storage unit. The image processing unit acquires images of constituent elements of the wire electrical discharge machine by means of the image pickup device 22. Based on the images acquired by the image processing unit, the maintenance necessity determination unit determines whether or not the maintenance of the wire electrical discharge machine is necessary. The storage unit previously holds images that serve as references for the determination by the maintenance necessity determination unit.

In general, the robot controller 10 and the wire electrical discharge machine controller 11 each comprise a processor, storage device, and. input/output device (none of which is shown). The processor reads and executes programs stored in the storage device and controls the input/output device, thereby logically implementing the above-described various processing units.

Figure 2:
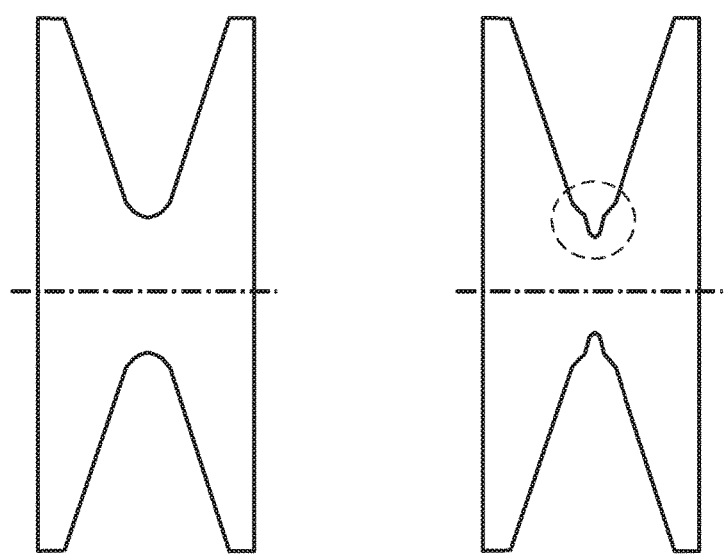
FIG. 2 is a view showing examples of images of a constituent element in a brand-new state and in a state just before the attainment of its serviceability limit.

FIG. 2 shows examples of images of the roller 2 picked up sideways by the image pickup device 22 mounted on the wrist of the robot 21. The left figure is an image of the roller 2 in a brand-new state, while the right figure is an image of the roller 2 lust before the attainment of its serviceability limit. The right figure indicates how that part of the roller 2 which is always in rolling contact with the wire 5 is worn. More specifically, the rolder 2 is subject to such wear as may be caused when the wire 5 bites into it at the portion enclosed by a broken line. Preferably, a machining operation of the wire electrical discharge machine should be stopped during the image pickup operation.

The following is a description of the operation of the inspection system 100. Example 1 shows a configuration in which the inspection system 100 determines the necessity of maintenance of the constituent elements in service, based on an image of a brand-new constituent element provided in advance. Example 2 shows a configuration in which the inspection system 100 determines the necessity of maintenance of the constituent elements in service, based on an image of a constituent element just before the attainment of the serviceability limit provided in advance. Example 3 shows a configuration in which the inspection system 100 determines the necessity of maintenance of the constituent elements in service, mainly based on the images acquired by the image processing unit.

EXAMPLE 1

Figure 3:
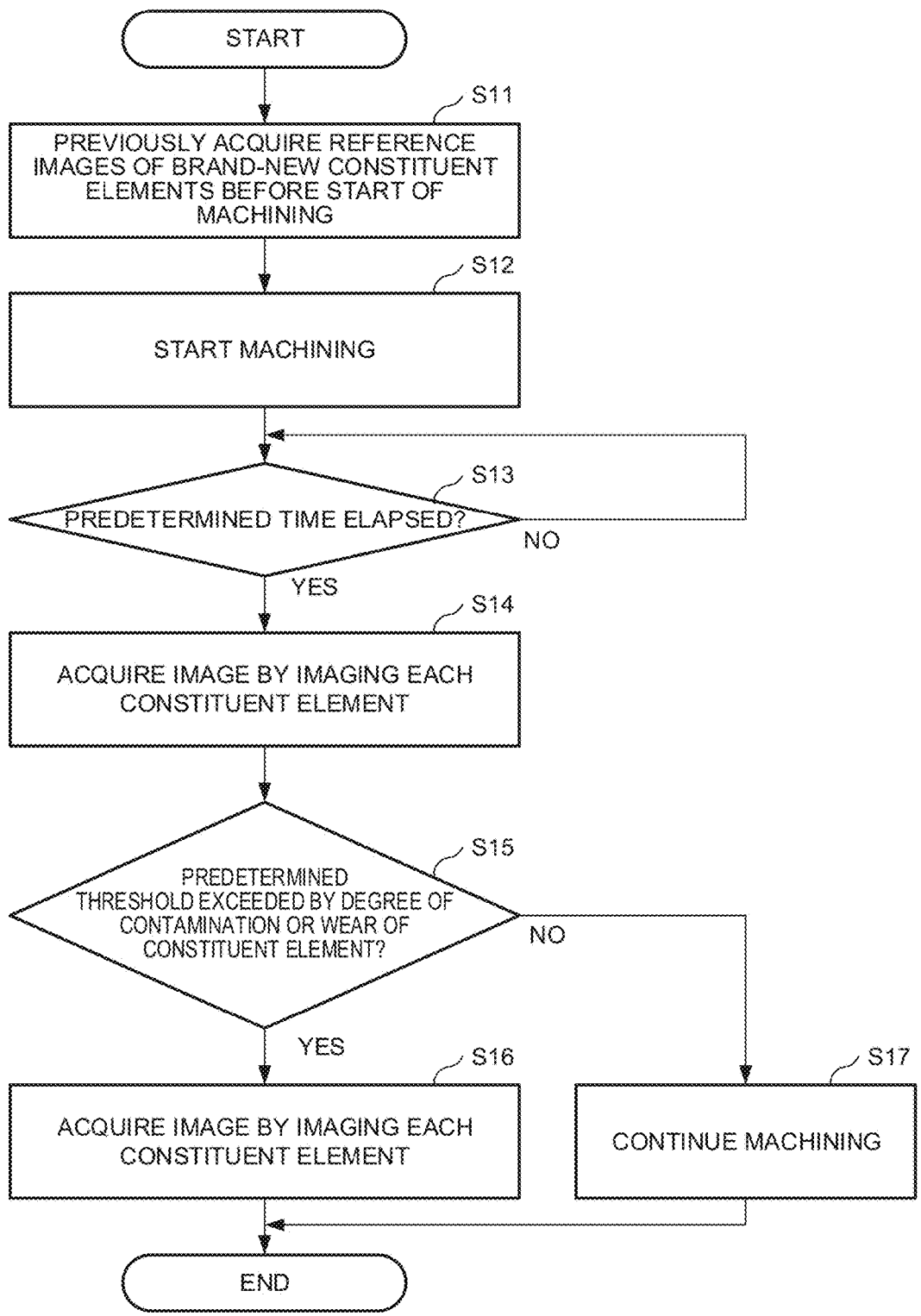
FIG. 3 is a diagram showing the operation of the inspection system 100 for a wire electrical discharge machine according to one example of the present invention.

The operation of the inspection system 100 according to Example 1 will be described with reference to the flowchart of FIG. 3.

Step S11:

The storage unit acquires reference images of the constituent elements in advance. Specifically, the reference images in this example are dirt-or wear-free images of the constituent elements including the roller 2 and the wire 5. Typically, they are images of brand-new constituent elements. For example, the image processing unit may be configured to acquire the images of the constituent elements by means of the image pickup device 22 before the start of machining and load them as the reference images into the storage unit. Alternatively, the storage unit may be configured to previously hold the images of the brand new constituent elements as the reference images.

Step S12:

The wire electrical discharge machine starts to machine the workpiece.

Steps S13 and S14:

After the lapse of a predetermined time, the image processing unit acquires the image of each constituent element by means of the image pickup device 22 mounted on the wrist of the robot 21. The image pickup device 22 may be mounted on any part of the arm of the robot. 21. If it is mounted on the wrist, the image pickup device 22 can enjoy design flexibility such that it can perform the image pickup from various directions, taking advantage of the flexible attitude change capacity of the robot. Thus, the image pickup device 22 should preferably be mounted near the wrist.

Step S15:

The maintenance necessity determination unit determines the maintenance necessity by comparing the reference images loaded into the storage unit in Step S11 and the image acquired in Step S14. The maintenance necessity may be determined by, for example, the degree of contamination, wear or the like of the constituent element.

For example, the degree of contamination of the constituent element can be determined by the depth of color of the image of the constituent element. More specifically, the severer the contamination, the deeper the color of the image of the constituent element is. Accordingly, the maintenance necessity determination unit compares the depth of color of the image acquired in Step S14 and that of the constituent element included in the reference images. For example, the maintenance necessity determination unit divides each of the constituent elements included in the reference images and the image acquired in Step S14 into a plurality of meshes. Then, it is determined whether or not the color density exceeds a predetermined density threshold for each mesh of the image acquired in Step S14. Here the density threshold can be set to any level between black and the density of the corresponding meshes of the reference images. Thereafter, the maintenance necessity determination unit determines whether or not the ratio or number of meshes with a density higher than the density threshold exceeds a determination threshold, in the image acquired in Step 514. Here any ratio or number can be designated as the determination threshold. If the determination threshold is exceeded, the maintenance necessity determination unit determines that maintenance is necessary for the constituent element concerned. This is because the constituent element concerned can be assumed to be contaminated in excess of a predetermined reference level.

Moreover, the degree of wear of the constituent element can be determined by the contour of the image of the constituent element. More specifically, the heavier the wear of the surface of the constituent element, the more retracted the contour line of the image of the constituent element is. Accordingly, the maintenance necessity determination unit compares the contour shape of the image acquired in Step S14 and that of the constituent element included in the reference images. For example, if the left and right figures of FIG. 2 are the reference image and the image acquired in Step S14, respectively, a difference is generated at the portion of the right figure enclosed by the broken line or the like when the respective contours of the two images are compared. Thus, deformation of the constituent element caused by wear can be detected as the difference. If this difference exceeds a predetermined determination threshold, the maintenance necessity determination unit determines that maintenance is necessary for the constituent element concerned. This is because the shape of the constituent element concerned can be assumed to have been brought close to its serviceability limit by wear. Here any size, e.g., 1 mm, can be designated as the determination threshold.

The above-described various thresholds may be set in advance or the wire electrical discharge machine controller 11 or the robot controller 10 may be provided with a means for accepting an input of setting of these thresholds.

If it is determined that maintenance is necessary, the processing proceeds to Step S16. If maintenance is unnecessary, in contrast, the processing proceeds to Step S17.

Step S16:

The maintenance necessity determination unit instructs the robot controller 10 to perform cleaning or replacement of those constituent elements which are determined to require maintenance. The robot controller 10 causes the robot to clean or replace the constituent elements of the wire electrical discharge machine.

When the cleaning or replacement by the robot is completed, the image processing unit preferably performs again the image pickup for each constituent element by means of the image pickup device 22. Then, the maintenance necessity determination unit determines again the necessary of maintenance of the constituent element concerned. As a result, if it is determined that maintenance is unnecessary, the wire electrical discharge machine resumes machining. Preferably, the processing proceeds to Step S13, whereupon the maintenance necessity may be determined again after the lapse of a predetermined time.

Moreover, the maintenance necessity determination unit may be configured to output the result of the determination of the maintenance necessity to an output means of the wire electrical discharge machine controller 11 or the robot controller 10.

Step S17:

The wire electrical discharge machine continues the machining. Preferably, the processing proceeds to Step S13, whereupon the maintenance necessity may be determined again after the lapse of the predetermined time.

EXAMPLE 2

Figure 4:
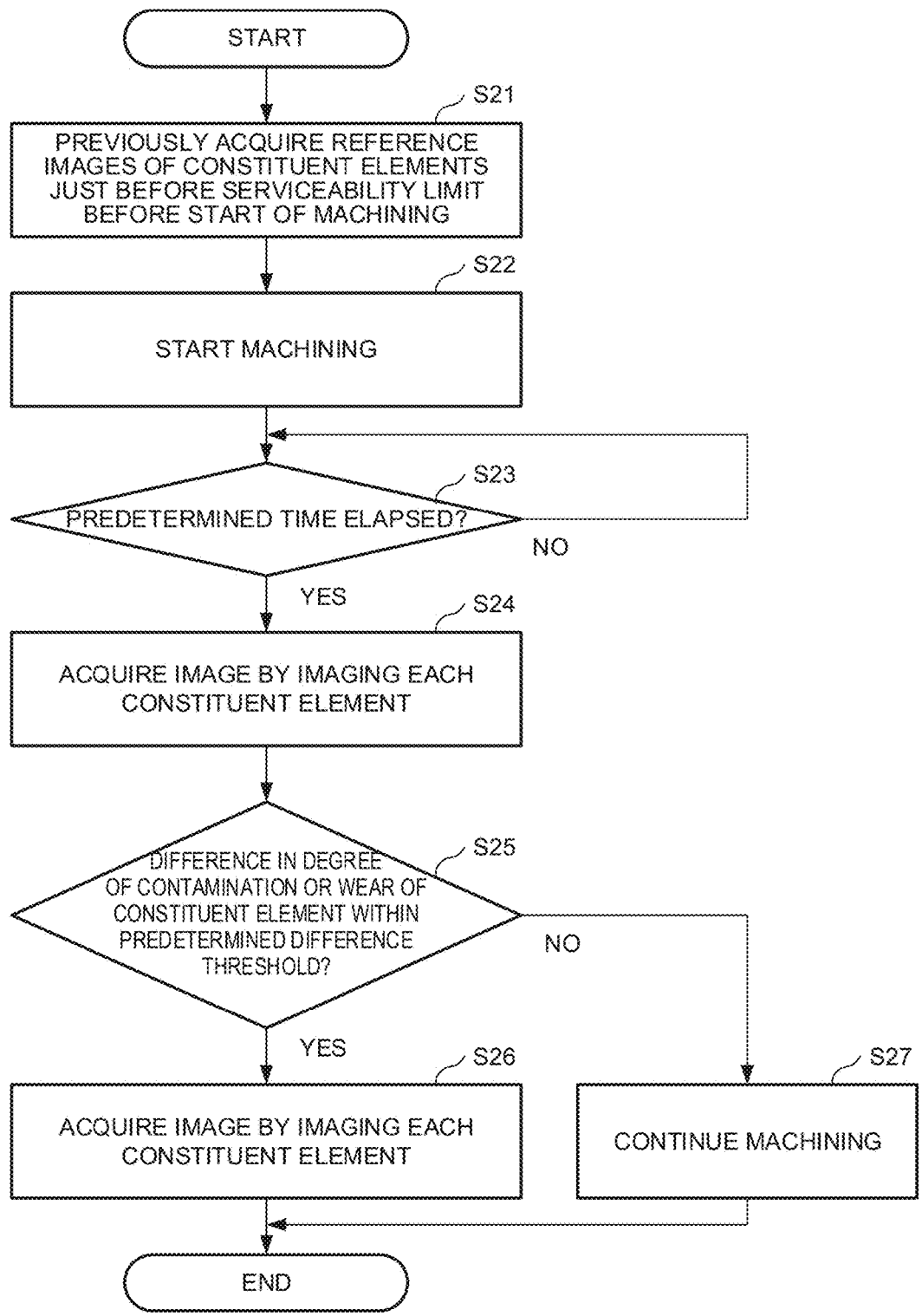
FIG. 4 is a diagram showing the operation of the inspection system 100 for a wire electrical discharge machine according to another example of the present invention.

The operation of the inspection system 100 according to Example 2 will be described with reference to the flowchart of FIG. 4.

Step S21:

The storage unit acquires reference images of the constituent elements in advance. Specifically, the reference images in this example are images of the constituent elements including the roller 2 and the wire 5 that are contaminated or worn to such an extent that they require cleaning, or replacement. Typically, they are images of the constituent elements in a state lust before the attainment of the serviceability limit. For example, the wire electrical discharge machine may be configured to first perform machining until the constituent elements reach the serviceability limit as the image processing unit acquires the images of the constituent elements by means of the image pickup device 22 and loads them as the reference images into the storage unit. Alternatively, the storage unit may be configured to previously hold the images of the constituent elements in the state just before the attainment of the serviceability limit as the reference images.

Steps S22 to S24:

The operation is performed in the same manner as in Steps S12 to S14 of Example 1.

Step S25:

The maintenance necessity determination unit determines the maintenance necessity by comparing the reference images loaded into the storage unit in Step S21 and an image acquired in Step S24.

For example, the maintenance necessity determination unit determines the degree of contamination of the constituent element by comparing the depth of color of the image acquired in Step S24 and that of the constituent element included in the reference images. More specifically, the maintenance necessity determination unit divides each of the constituent elements included in the reference images and the image acquired in Step S24 into a plurality of meshes. Then, it is determined whether or not the difference in color density falls within a predetermined density difference threshold for each mesh of the image acquired. On Step S24.

Here the density difference threshold can be set to any level for the corresponding meshes of the reference images. Thereafter, the maintenance necessity determination unit determines whether or not the ratio or number of meshes with a density difference within the density difference threshold exceeds a determination threshold, in the image acquired in Step S24. Here any ratio or number can be designated as the determination threshold. If the determination threshold is exceeded, the maintenance necessity determination unit determines that maintenance is necessary for the constituent element concerned. This is because the constituent element concerned can be assumed to be contaminated in excess of a predetermined reference level.

Moreover, the maintenance necessity determination unit can determine the degree of wear of the constituent element by comparing the contour shape of the image acquired. On Step S24 and that of the constituent element included in the reference images. More specifically, if the difference between the contour shape of the image acquired in Step S24 and that of the constituent element included in the reference images is not larger than a predetermined determination threshold, the maintenance necessity determination unit determines that maintenance is necessary for the constituent element concerned. This is because the shape of the constituent element concerned can be assumed to have been brought close to its serviceability limit by wear. Here any size, e.g., 0.2 mm, can be designated as the determination difference threshold.

If it is determined that maintenance is necessary, the processing proceeds to Step S26. If maintenance is unnecessary, in contrast, the processing proceeds to Step S27.

Steps S26 and S27:

The operation is performed in the same manner as in Steps S16 to S17 of Example 1.

EXAMPLE 3

Figure 5:
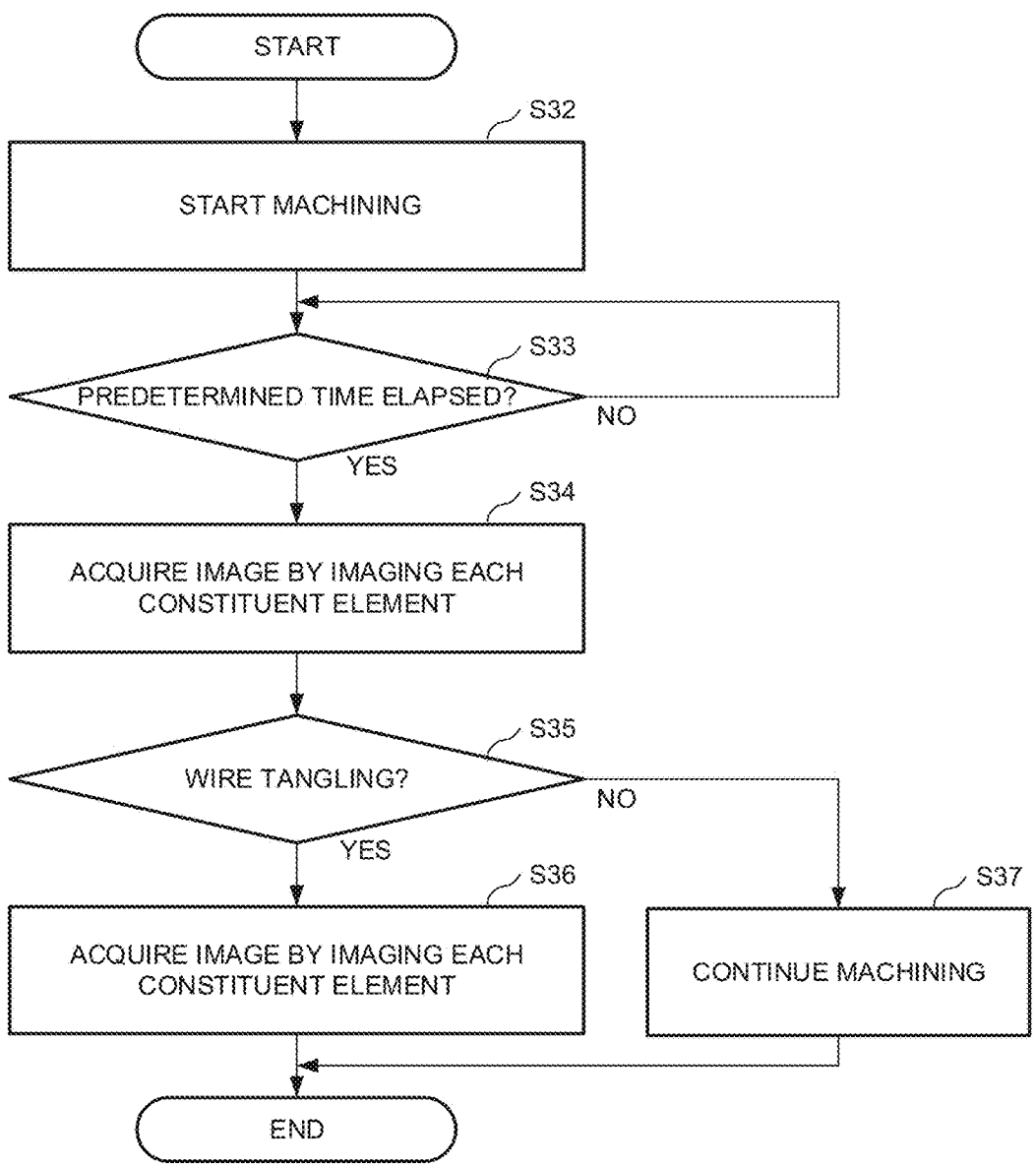
FIG. 5 is a diagram showing the operation of the inspection system 100 for a wire electrical discharge machine according to still another example of the present invention.

The operation of the inspection system 100 according to Example 3 will be described with reference to the flowchart of FIG. 5.

Steps S32 to S34:

The operation is performed in the same manner as in Steps S12 to S14 of Example 1.

Step S35:

The maintenance necessity determination unit determines the maintenance necessity based on an image acquired in Step S34. The maintenance necessity can be determined by the occurrence or nonoccurrence of wire tangling, for example.

Figure 6A:
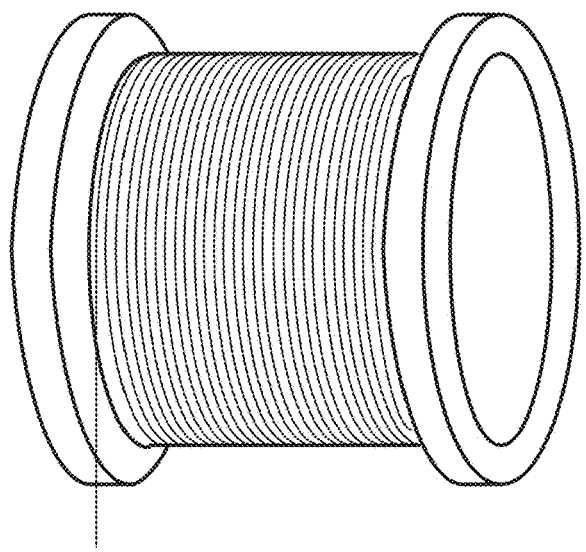
FIG. 6A is a perspective view showing a normal state of a wire bobbin.
Figure 6B:
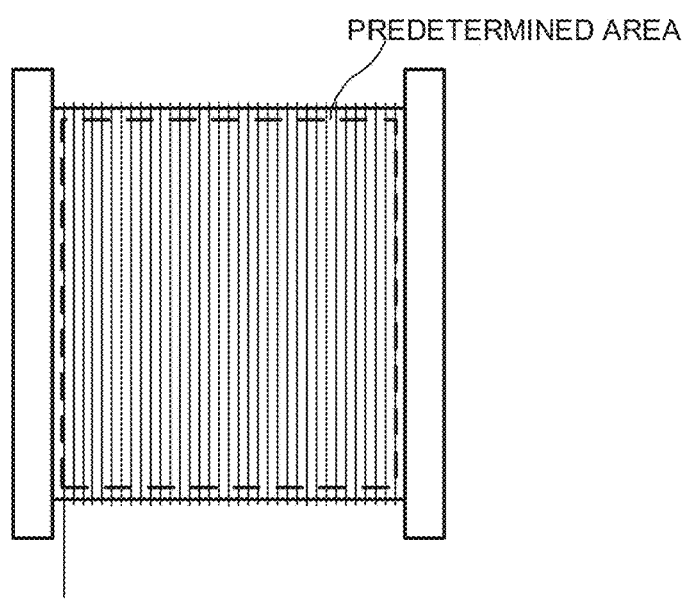
FIG. 6B is a side view corresponding to FIG. 6A.
Figure 6C:
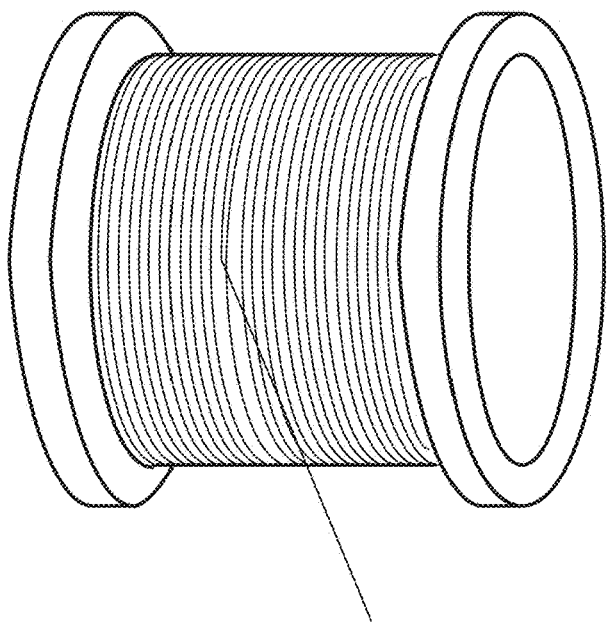
FIG. 6C is a perspective view showing how wire tangling occurs.
Figure 6D:
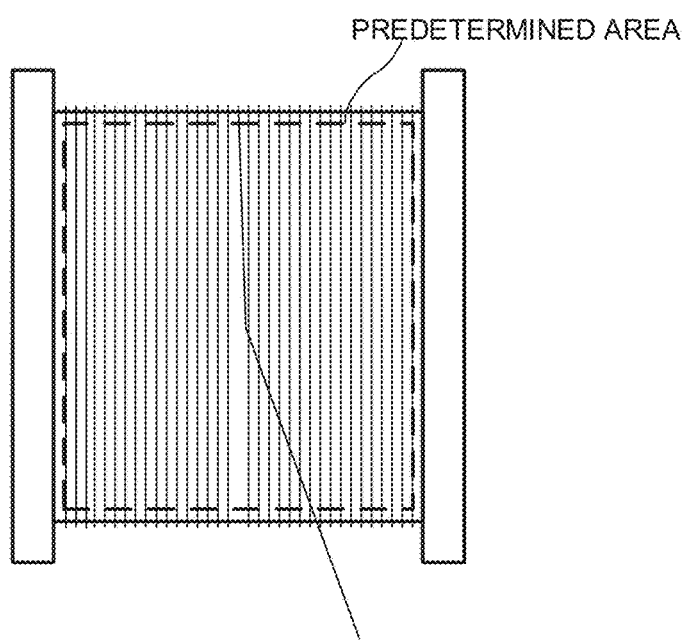
FIG. 6D is a side view corresponding to FIG. 6C.

The wire tangling can be determined by the state of the wire on the bobbin as a constituent element. As shown in FIG. 6A, the wire is normally wound substantially parallel to the circumferential direction of the bobbin. FIG. 6B is a side view corresponding to FIG. 6A. If the wire is left in such a state that it is suddenly bent at a certain point as a cylindrical portion of the bobbin is viewed laterally, that is, the wire is not parallel to (or extends across) another wire, as shown in FIG. 6C and. FIG. 6D (side view corresponding to FIG. 6C), however, the wires may be entangled with each other. This state in which the wire crawls under another wire and is suddenly bent to become non-parallel at a certain point is called the wire tangling. The wire tangling can be determined by detecting edges of the wires from a captured image in a predetermined area as viewed from the side surface of the cylindrical portion of the bobbin and inspecting whether or not those portions in which the wires are suddenly bent to become non parallel at a certain point exist in a predetermined area (indicated by broken lines in FIGS. 6B and 6D). Thereupon, the maintenance necessity determination unit extracts the edges of the wires from the captured image of the bobbin.

Then, it is determined whether or not angles between vectors or straight lines indicative of the directions of a plurality of edges are not larger than a predetermined determination threshold. Here any angle can be designated as the determination threshold. If a starting point at which the determination threshold is exceeded and an angle is generated exists in the above-described predetermined area, the maintenance necessity determination unit determines that the constituent element concerned or the bobbin requires maintenance. This is because the bobbin, which is subject to wire tangling, is left as it is, it is presumable that the wires are highly possibly be soon entangled and fully locked.

Figure 7A:
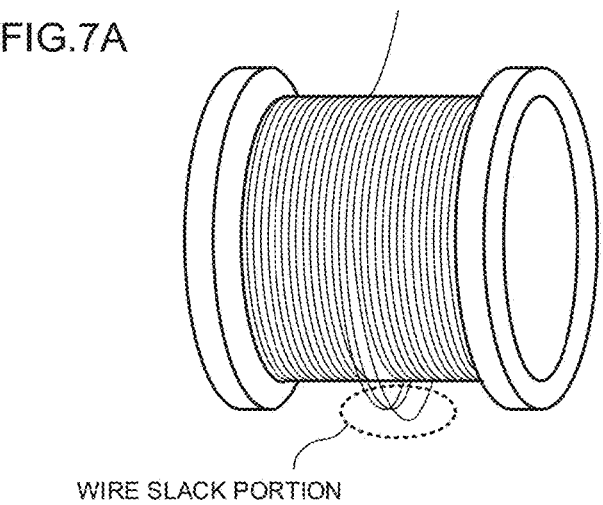
FIG. 7A is a perspective view showing how wire slack occurs.
Figure 7B:
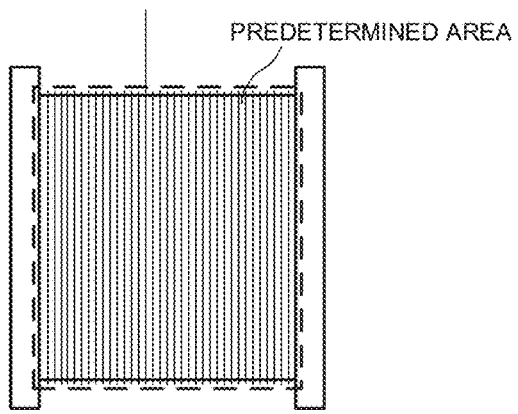
FIG. 7B a side view showing a normal state without wire slack.
Figure 7C:
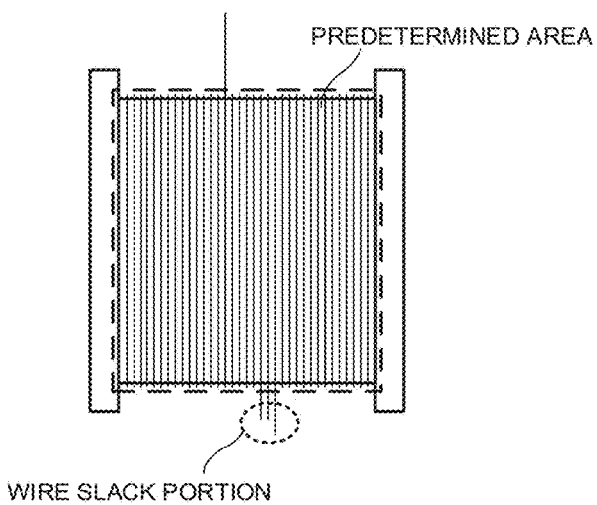
FIG. 7C is a side view corresponding to FIG. 7A.

Also, slack of the wire on the bobbin (see FIG. 7A) can be determined based on an image acquired by imaging the side surface of the cylindrical portion. If no wire image exists outside the predetermined area (indicated by the broken line), as shown in FIG. 7B, the maintenance necessity determination unit determines that the wire is not slack. If a wire image exists outside the predetermined area (indicated by the broken line), as shown in. FIG. 7C, in contrast, the wire is determined to be slack. While the slack of the wire lowers the machining accuracy, the maintenance necessity determination unit according to the present embodiment can contribute to a reduction in the machining failure rate by detecting it early.

Typically, as shown in FIGS. 6B, 6D, 7B and 7C, the above-described predetermined area should be defined as a shape similar to the contour shape of the trunk of a bobbin, that is, a shaft portion wound with the wire, on the image of the side surface of the cylindrical portion of the bobbin. More specifically, in the detection of wire tangling, as shown in FIGS. 6B and 6D, a rectangular predetermined area may only be set a little inside the contour shape of the trunk of a bobbin, that is, a bobbin wound with no wire. In the detection of wire slack, as shown in FIGS. 7B and 7C, a rectangular predetermined area may only be set a little outside the contour shape of the trunk of a bobbin, that is, a brand-new bobbin with an unused wire. This is in order to avoid the influence of the wire consumption, since the contour shape of the bobbin trunk varies depending on the wire consumption.

If it is determined that maintenance is necessary, the processing proceeds to Step 536, If maintenance is unnecessary, in contrast, the processing proceeds to Step S37.

Steps S36 and S37:

The operation is performed in the same mariner as in Steps S16 to S17 of Example 1.

According to the present embodiment, the image processing unit of the inspection system 100 periodically acquires the images of the constituent elements by means of the image pickup device 22 mounted on the wrist of the robot 21, and the maintenance necessity determination unit determines the maintenance necessity based on the degree of contamination, wear or the like. In this way, long halt. (prolonged stoppage) due to trouble in the constituent elements can be prevented.

Moreover, according to the present embodiment, the maintenance necessity determination unit causes the robot to clean or replace the constituent elements. Since the availability of the wire electrical discharge machine during unattended operation can be improved by doing this, the wire electrical discharge machine can achieve automatic machining that has conventionally been believed to be difficult.

The present invention is not limited to the embodiment described above, and is also applicable to various inspection objects without departing from the spirit of the invention. For example, the present invention is also applicable to the inspection of the degree of contamination or wear of a feeder nozzle, inspection of contamination of a current-carrying part of an automatic connection function, and the like, as well as to the above-described three examples.

Furthermore, the present invention is not limited to the various embodiments described above, and modifications, such as replacement, omission, addition, and rearrangement of the constituent elements, can be effected without departing from the spirit of the invention.

The invention claimed is:

1. An inspection system for a wire electrical discharge machine, the inspection system comprising:
    a robot configured to inspect a constituent element of the wire electrical discharge machine, wherein the wire electrical discharge machine is configured to machine a workpiece by electrical discharge between a wire electrode and the workpiece;
    an image pickup device provided on a movable part of the robot and configured to image the constituent element;
    an image processing unit configured to acquire an image of the constituent element by the image pickup device; and
    a maintenance necessity determination unit configured to determine the necessity of maintenance of the constituent element based on the image acquired by the image processing unit,
    wherein
    the constituent element includes at least one selected from the group consisting of
        the wire electrode of the wire electrical discharge machine,
        an element in a mechanism for feeding the wire electrode through the wire electrical discharge machine, and
        an expendable of the wire electrical discharge machine,
    the maintenance of the constituent element includes cleaning or replacement of the constituent element.

2. The inspection system according to claim 1, further comprising:
    a storage unit configured to store a reference image of the constituent element,
    wherein the maintenance necessity determination unit is configured to determine the necessity of maintenance of the constituent element by comparing the reference image and the image acquired by the image processing unit.

3. The inspection system according to claim 2, wherein the reference image is an image of the constituent element in a brand-new state.

4. The inspection system according to claim 2, wherein the reference image is an image of the constituent element just before the attainment of the serviceability limit thereof.

5. The inspection system according to claim 2, wherein the maintenance necessity determination unit is configured to determine the necessity of maintenance by
    comparing respective color densities of the reference image and the image acquired by the image processing unit, and
    determining the degree of contamination of the constituent element.

6. The inspection system according to claim 2, wherein the maintenance necessity determination unit is configured to determine the necessity of maintenance by
comparing respective shapes of the reference image and the image acquired by the image processing unit, and determining the degree of wear of the constituent element.

7. The inspection system according to claim 1, wherein the maintenance necessity determination unit is configured to determine the necessity of maintenance by determining the presence of wire electrode tangling according to whether or not a bent portion of the wire electrode is included in a predetermined area of the side surface of a cylindrical portion of a wire electrode bobbin, based on the image acquired by the image processing unit.

8. The inspection system according to claim 1, wherein the maintenance necessity determination unit is configured to determine the necessity of maintenance by determining the presence of wire electrode slack according to whether or not the wire electrode exists outside a predetermined area of the side surface of a cylindrical portion of a wire electrode bobbin, based on the image acquired by the image processing unit.

9. The inspection system according to claim 1, further comprising:
an input device configured to receive setting of a determination reference for the determination of the necessity of maintenance.

10. The inspection system according to claim 1, further comprising:
an output device configured to output a result of the determination by the maintenance necessity determination unit to the outside.

11. The inspection system according to claim 1, wherein the robot is configured to clean or replace the constituent element of the wire electrical discharge machine in response to the maintenance necessity determination unit determines that the constituent element requires maintenance.

12. The inspection system according to claim 1, wherein, in response to cleaning or replacement of the constituent element of the wire electrical discharge machine by the robot,
the image processing unit is configured to acquire again an image of the constituent element by the image pickup device,
the maintenance necessity determination unit is configured to determine the necessity of maintenance of the constituent element based on the image acquired again by the image processing unit, and
the wire electrical discharge machine is configuration to resume machining in response to an ascertainment that maintenance of the constituent element is unnecessary.

* * * * *